US012663052B2

(12) United States Patent
Hattori

(10) Patent No.: US 12,663,052 B2
(45) Date of Patent: Jun. 23, 2026

(54) TUBULAR ANTIVIBRATION DEVICE

(71) Applicant: Sumitomo Riko Company Limited,
Aichi (JP)

(72) Inventor: Masaya Hattori, Aichi (JP)

(73) Assignee: Sumitomo Riko Company Limited,
Aichi (JP)

( * ) Notice: Subject to any disclaimer, the term of this
patent is extended or adjusted under 35
U.S.C. 154(b) by 431 days.

(21) Appl. No.: 18/314,784

(22) Filed: May 9, 2023

(65) Prior Publication Data

US 2023/0272834 A1     Aug. 31, 2023

Related U.S. Application Data

(63) Continuation of application No.
PCT/JP2022/010157, filed on Mar. 9, 2022.

(30) Foreign Application Priority Data

Mar. 16, 2021     (JP) ................................. 2021-042755

(51) Int. Cl.
*F16F 1/38*         (2006.01)
*F16F 1/377*        (2006.01)
*B60K 5/12*         (2006.01)

(52) U.S. Cl.
CPC ............ *F16F 1/3835* (2013.01); *F16F 1/377*
(2013.01); *F16F 1/3863* (2013.01); *B60K 5/12*
(2013.01)

(58) Field of Classification Search
CPC ........ F16F 1/3835; F16F 1/3863; F16F 1/376;
F16F 1/377
See application file for complete search history.

(56) References Cited

U.S. PATENT DOCUMENTS

| | | | |
|---|---|---|---|
| 3,685,772 A | 8/1972 | Giaccone | |
| 5,865,429 A * | 2/1999 | Gautheron | .............. F16F 1/387 |
| | | | 267/293 |

(Continued)

FOREIGN PATENT DOCUMENTS

| | | | | |
|---|---|---|---|---|
| AU | 1807270 | 2/1972 | | |
| DE | 102011101185 A1 * | 1/2012 | ............ | F16F 1/3863 |

(Continued)

OTHER PUBLICATIONS

"International Search Report (Form PCT/ISA/210) of PCT/JP2022/
010157", mailed on Apr. 19, 2022, with English translation thereof,
pp. 1-4.

*Primary Examiner* — Devon C Kramer
(74) *Attorney, Agent, or Firm* — JCIPRNET

(57) ABSTRACT

A tubular antivibration device includes an inner axial mem-
ber and an outer tubular member that are joined by an elastic
rubber main body. The inner axial member is provided with
a pair of groove-shaped recesses that open on the outer
peripheral surface on both sides in the lateral direction and
extend in the vertical direction, and the elastic rubber main
body is integrally provided with a pair of upper and lower
first elastic joining parts that join the vertically opposing
surfaces of the inner axial member and the outer tubular
member to each other on both sides in the vertical direction
and a pair of left and right second elastic joining parts that
join the vertically opposing surfaces of the outer tubular
member to each other through the pair of groove-shaped
recesses of the inner axial member.

6 Claims, 8 Drawing Sheets

(56) References Cited

U.S. PATENT DOCUMENTS

| | | | | |
|---|---|---|---|---|
| 7,866,639 | B2 * | 1/2011 | Endo ....................... | F16F 13/14 |
| | | | | 267/219 |
| 9,976,618 | B2 | 5/2018 | Eguchi | |
| 9,995,363 | B2 * | 6/2018 | Shinohara .............. | B60G 7/008 |
| 10,465,762 | B2 | 11/2019 | Nishi et al. | |
| 2005/0035506 | A1 * | 2/2005 | de Fontenay ........ | B60G 21/052 |
| | | | | 267/140.12 |
| 2015/0219175 | A1 | 8/2015 | Eguchi | |
| 2018/0328433 | A1 | 11/2018 | Nishi et al. | |

FOREIGN PATENT DOCUMENTS

| | | | | | |
|---|---|---|---|---|---|
| JP | | 84915194 | | 4/1974 | |
| JP | | H08284993 | | 11/1996 | |
| JP | | 6368889 B1 * | | 8/2018 | ........... B60K 5/1291 |
| WO | | 2015045041 | | 4/2015 | |
| WO | | 2018207336 | | 11/2018 | |

* cited by examiner

TUBULAR ANTIVIBRATION DEVICE

CROSS-REFERENCE TO RELATED APPLICATION

The present application is a continuation of PCT/JP2022/010157, filed on Mar. 9, 2022, and is related to and claims priority from Japanese Patent Application No. 2021-042755, filed on Mar. 16, 2021. The entire contents of the aforementioned application are hereby incorporated by reference herein.

TECHNICAL FIELD

The disclosure relates to a tubular antivibration device applied to, for example, an engine mount, a differential mount, etc. of an automobile.

RELATED ART

Conventionally, there is known a tubular antivibration device having a structure in which an inner axial member and an outer tubular member are joined by an elastic rubber main body, as shown in International Publication No. 2015/045041 (Patent Literature 1), for example.

In the tubular antivibration device of Patent Literature 1, the vertically opposing surfaces of the inner axial member and the outer tubular member are joined by the elastic rubber main body, and a high spring constant based on the compression spring components of the elastic rubber main body can be set in the vertical direction.

However, the spring properties required in each direction of the tubular antivibration device are not constant, and are appropriately set according to, for example, the properties required for each vehicle to which the tubular antivibration device is applied. Thus, with the structure of Patent Literature 1, one of the purposes of which is to set a high spring constant in the vertical direction, it may be difficult to cope with, for example, a case where a low spring constant is required in the vertical direction.

In the structure of Patent Literature 1, if the lateral width of the joining leg part that constitutes the elastic rubber main body is reduced, the spring constant in the vertical direction can be reduced, but consequently, buckling of the elastic rubber main body (joining leg part) is likely to occur, which may hinder the durability and load support performance of the elastic rubber main body. In addition, there is a possibility that the spring constants in the axial direction and the lateral direction may become smaller than necessary, and the required spring properties (spring ratio) may not be satisfied.

SUMMARY

The disclosure provides a tubular antivibration device having a novel structure that is capable of achieving durability or the like of the elastic rubber main body while increasing the degree of freedom in tuning the spring ratio in each direction.

Aspects for understanding the disclosure will be described hereinafter, but each aspect described below is exemplary and can be employed in combination with each other as appropriate, and multiple components described in each aspect can be recognized and employed independently where possible and can also be employed in combination with any component described in another aspect as appropriate. Accordingly, the disclosure can be implemented in various other aspects without being limited to the aspects described below.

The first aspect provides a tubular antivibration device in which an inner axial member and an outer tubular member are joined by an elastic rubber main body. The inner axial member includes a pair of groove-shaped recesses that open on an outer peripheral surface on both sides in a lateral direction and extend in a vertical direction. The elastic rubber main body integrally includes a pair of upper and lower first elastic joining parts joining vertically opposing surfaces of the inner axial member and the outer tubular member to each other on both sides in the vertical direction, and a pair of left and right second elastic joining parts joining vertically opposing surfaces of the outer tubular member to each other through the pair of groove-shaped recesses of the inner axial member.

According to the tubular antivibration device constructed according to this aspect, the part that is mainly compressed and deformed when vibration is input in the vertical direction is set as the first elastic joining part which is a part of the elastic rubber main body so that the spring constant of the elastic rubber main body in the vertical direction is reduced compared to a case where the entire elastic rubber main body is compressed and deformed. Since the second elastic joining part of the elastic rubber main body is fixed to the vertically opposing surfaces of the outer tubular member through the groove-shaped recess that extends in the vertical direction, the spring constant against vibration input in the vertical direction is made smaller than the first elastic joining part to reduce the spring in the vertical direction.

Besides the spring of the first elastic joining part, the spring of the second elastic joining part also acts effectively when vibration is input in the lateral direction and the axial direction. Thus, a relatively high spring constant can be set in the lateral direction and the axial direction where the shear spring tends to reduce the spring constant. Thus, for example, it is possible to bring the springs in the lateral direction and the axial direction close to the spring in the vertical direction, and the spring ratio can be set with a large degree of freedom.

The second elastic joining part which constitutes both side portions of the elastic rubber main body in the lateral direction extends continuously in the vertical direction through the groove-shaped recess without being divided by the inner axial member. Thus, it is possible to ensure that the free length in the left and right side portions of the elastic rubber main body is long, thereby improving the durability of the elastic rubber main body.

According to the second aspect, in the tubular antivibration device described according to the first aspect, a first hollow hole is formed to penetrate the first elastic joining part of the elastic rubber main body in an axial direction, and a first stopper protrusion is provided on the vertically opposing surfaces of the inner axial member and the outer tubular member to protrude into the first hollow hole.

According to the tubular antivibration device constructed according to this aspect, the spring properties of the elastic rubber main body can be tuned by the first hollow hole, and particularly the spring in the vertical direction can be reduced. In addition, since the contact between the first stopper protrusion and the inner axial member or the outer tubular member limits the amount of relative displacement in the vertical direction between the inner axial member and the outer tubular member, damage caused by excessive deformation of the elastic rubber main body is avoided.

According to the third aspect, in the tubular antivibration device described according to the first or second aspect, second hollow holes are formed to penetrate in the axial direction on outer sides in the lateral direction with respect to the second elastic joining parts of the elastic rubber main body.

According to the tubular antivibration device constructed according to this aspect, the spring properties of the elastic rubber main body can be tuned by the second hollow hole. Since a large free surface is ensured for the second elastic joining part exposed on the hole inner surface of the second hollow hole, the durability of the elastic rubber main body is also improved.

According to the fourth aspect, in the tubular antivibration device described according to the third aspect, second stopper protrusions are respectively provided on both sides of the inner axial member in the axial direction to protrude into the second hollow holes in the lateral direction, and the groove-shaped recess is provided axially between the second stopper protrusions on both sides in the axial direction.

According to the tubular antivibration device constructed according to this aspect, since the contact between the second stopper protrusion and the outer tubular member limits the amount of relative displacement between the inner axial member and the outer tubular member in the lateral direction and the torsional direction, damage caused by excessive deformation of the elastic rubber main body is avoided. Further, the second stopper protrusion is constituted by the side wall of the groove-shaped recess, making it possible to simplify the structure and reduce the number of parts.

According to the fifth aspect, in the tubular antivibration device described according to any one of the first to fourth aspects, the second elastic joining part has an axial length that is increased toward both outer sides in the vertical direction, and the second elastic joining part has a smallest axial length that is equal to or smaller than a groove width of the groove-shaped recess.

According to the tubular antivibration device constructed according to this aspect, when vibration is input in the vertical direction, the second elastic joining part is less likely to be compressed between the groove-shaped recess and the outer tubular member, and the compression spring component of the second elastic joining part is reduced to reduce the spring in the vertical direction.

According to the sixth aspect, in the tubular antivibration device described according to any one of the first to fifth aspects, the groove-shaped recess has an axial groove width that increases toward both outer sides in the vertical direction at both end portions of the groove-shaped recess in the vertical direction, and the elastic rubber main body including the second elastic joining part is filled inside the groove-shaped recess.

According to the tubular antivibration device constructed according to this aspect, since the restriction on the second elastic joining part due to the side wall of the groove-shaped recess is reduced at both end portions of the expanded groove-shaped recess in the vertical direction, the spring constant of the second elastic joining part in the vertical direction can be further reduced.

According to the seventh aspect, in the tubular antivibration device described according to any one of the first to fifth aspects, the second elastic joining part is arranged apart from a side wall inner surface of the groove-shaped recess on an inner side of the groove-shaped recess in a groove width direction.

According to the tubular antivibration device constructed according to this aspect, since the restriction on the second elastic joining part due to the side wall of the groove-shaped recess is reduced, the spring constant of the second elastic joining part in the vertical direction can be further reduced.

According to the disclosure, it is possible to achieve durability or the like of the elastic rubber main body while increasing the degree of freedom in tuning the spring ratio in each direction.

DESCRIPTION OF EMBODIMENTS

Hereinafter, embodiments of the disclosure will be described with reference to the drawings.

FIG. 1 to FIG. 4 show an engine mount 10 for an automobile as the first embodiment of a tubular antivibration device constructed according to the disclosure. The engine mount 10 has a structure in which an inner axial member 12 and an outer tubular member 14 are joined by an elastic rubber main body 16. In the following description, as a general rule, the vertical direction refers to the vertical direction in FIG. 2, and the lateral direction refers to the lateral direction in FIG. 2. It should be noted that each direction defined here is a direction set for the sake of convenience, and does not necessarily match, for example, each direction of the automobile.

Figure 5:
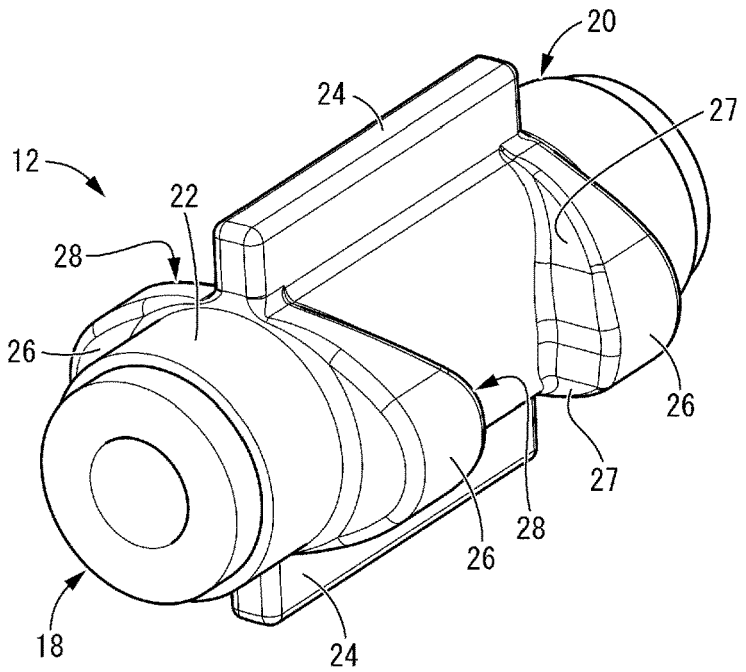
FIG. 5 is a perspective view of an inner axial member constituting the engine mount shown in FIG. 1.

As shown in FIG. 5, the inner axial member 12 has a structure in which a resin member 20 is fixed to the outer peripheral surface of a shaft fitting 18 having a thick, small-diameter, substantially tubular shape. The resin member 20 includes a fixing tubular part 22 that covers the outer peripheral surface of the shaft fitting 18. The resin member 20 includes a pair of first stopper protrusions 24 protruding from the fixing tubular part 22 to both sides in the vertical direction. The first stopper protrusion 24 protrudes with a substantially rectangular cross section, is shorter than the fixing tubular part 22 in the axial direction of the inner axial member 12, and is provided in the axial central portion of the fixing tubular part 22.

The resin member 20 of the inner axial member 12 includes second stopper protrusions 26. The second stopper protrusions 26 are provided on both sides of the fixing tubular part 22 in the axial direction to respectively protrude to both sides in the lateral direction, and the resin member 20 is provided with four second stopper protrusions 26. The axially inner opposing surfaces of the second stopper protrusions 26 on both sides in the axial direction are inclined surfaces 27 that are inclined outward in the axial direction toward both outer sides in the vertical direction respectively at both end portions in the vertical direction, and the axial length decreases toward both sides from the center in the vertical direction. The axial length of the second stopper protrusion 26 is substantially constant in the vertically central portion outside the inclined surfaces 27. The protruding tip surface of the second stopper protrusion 26 is a curved surface that curves in an elliptical shape in the circumferential direction of the inner axial member 12, and the lateral protruding height of the second stopper protrusion 26 decreases toward both outer sides in the vertical direction.

In the inner axial member 12, a groove-shaped recess 28 that opens in the lateral direction and extends in the vertical direction is formed between the second stopper protrusions 26 arranged to face each other in the axial direction. Since the side walls of the groove-shaped recess 28 are constituted by the second stopper protrusions 26, at both end portions in the vertical direction where the side wall inner surfaces are constituted by the inclined surfaces 27, the axial groove width increases toward both outer sides in the vertical direction. Further, the lateral groove depth of the groove-shaped recess 28 decreases toward both outer sides in the vertical direction. Since the pair of second stopper protrusions 26 are provided on both sides of the inner axial member 12 in the lateral direction, the groove-shaped recesses 28 are respectively provided on both sides of the inner axial member 12 in the lateral direction.

The outer tubular member 14 has a substantially tubular shape that is thinner and has a larger diameter than the shaft fitting 18 of the inner axial member 12, and is a hard member made of metal or the like. The outer tubular member 14 has a shorter axial length than the inner axial member 12.

The inner axial member 12 is inserted into the outer tubular member 14 in a state of protruding to both sides in the axial direction, and the inner axial member 12 and the outer tubular member 14 are elastically joined by the elastic rubber main body 16. The elastic rubber main body 16 includes a first elastic joining part 30 arranged between the vertically opposing surfaces of the inner axial member 12 and the outer tubular member 14, and a second elastic joining part 32 arranged between the vertically opposing surfaces of the outer tubular member 14 at a position apart from the inner axial member 12.

The first elastic joining part 30 is fixed to the inner axial member 12 in the axial central portion of the fixing tubular part 22 that constitutes the bottom wall of the groove-shaped recess 28. A pair of upper and lower first elastic joining parts 30 are provided to be fixed to the respective surfaces of the inner axial member 12 in the vertical direction. Then, both ends of the first elastic joining part 30 in the vertical direction are fixed to the vertically opposing surfaces of the fixing tubular part 22 of the inner axial member 12 and the outer tubular member 14, and the first elastic joining part 30 elastically joins the inner axial member 12 and the outer tubular member 14 to each other in the vertical direction on both sides in the vertical direction. The axial length of the first elastic joining part 30 increases from the side of the inner axial member 12 toward the side of the outer tubular member 14 in the vertical direction.

A first hollow hole 34 penetrating in the axial direction is respectively formed in the laterally central portion of each first elastic joining part 30. As the first hollow hole 34 is formed, each first elastic joining part 30 is substantially divided into both sides in the lateral direction across the first hollow hole 34. The lateral width of the first hollow hole 34 is smaller than the diameter (lateral width) of the shaft fitting 18 in the inner axial member 12, and the first hollow hole 34 is located on the inner side in the lateral direction with respect to both ends of the shaft fitting 18 in the lateral direction. The first hollow hole 34 may have a larger lateral width than the shaft fitting 18.

The first stopper protrusions 24 provided on both upper and lower sides of the inner axial member 12 protrude into the first hollow holes 34. The protruding tip of the first stopper protrusion 24 is separated from the inner surfaces of the first hollow hole 34 on the upper and lower outer sides so as to form a predetermined stopper clearance.

Figure 6:
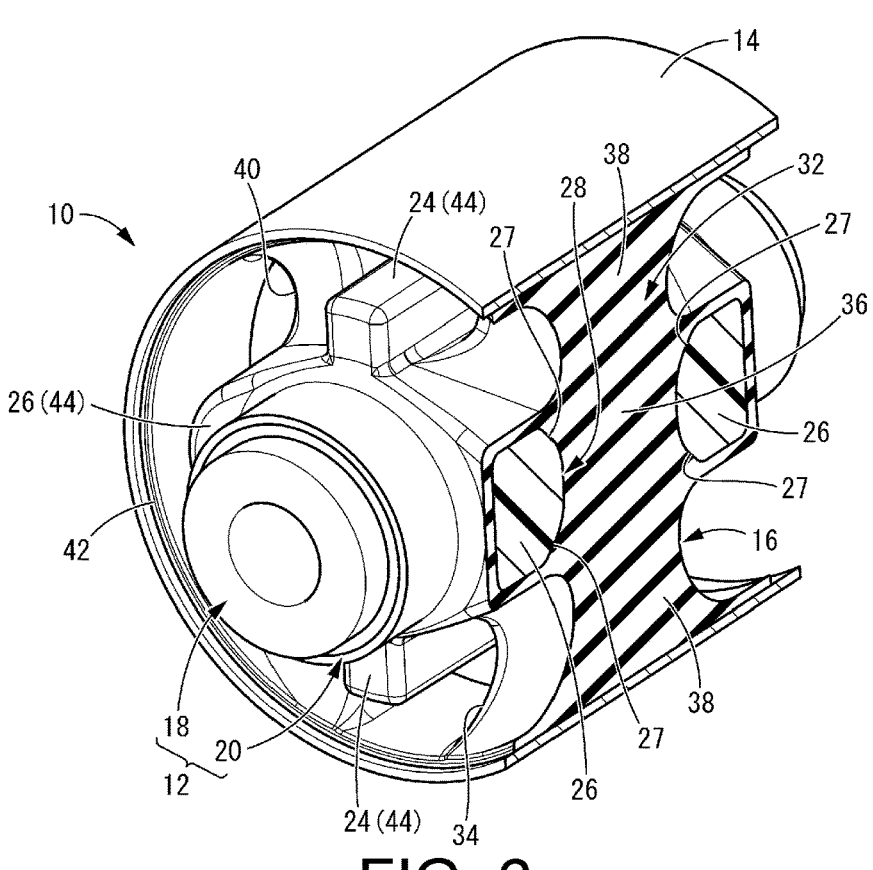
FIG. 6 is a perspective cross-sectional view of the engine mount shown in FIG. 1.
Figure 7:
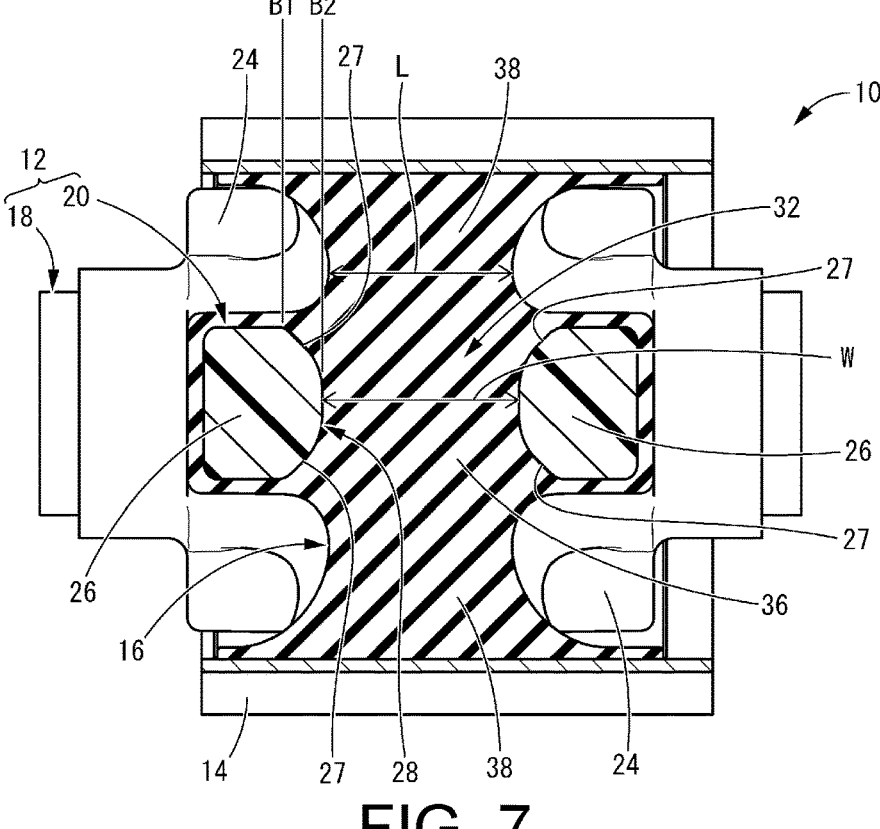
FIG. 7 is a cross-sectional view along the line VII-VII of FIG. 3.
Figure 8:
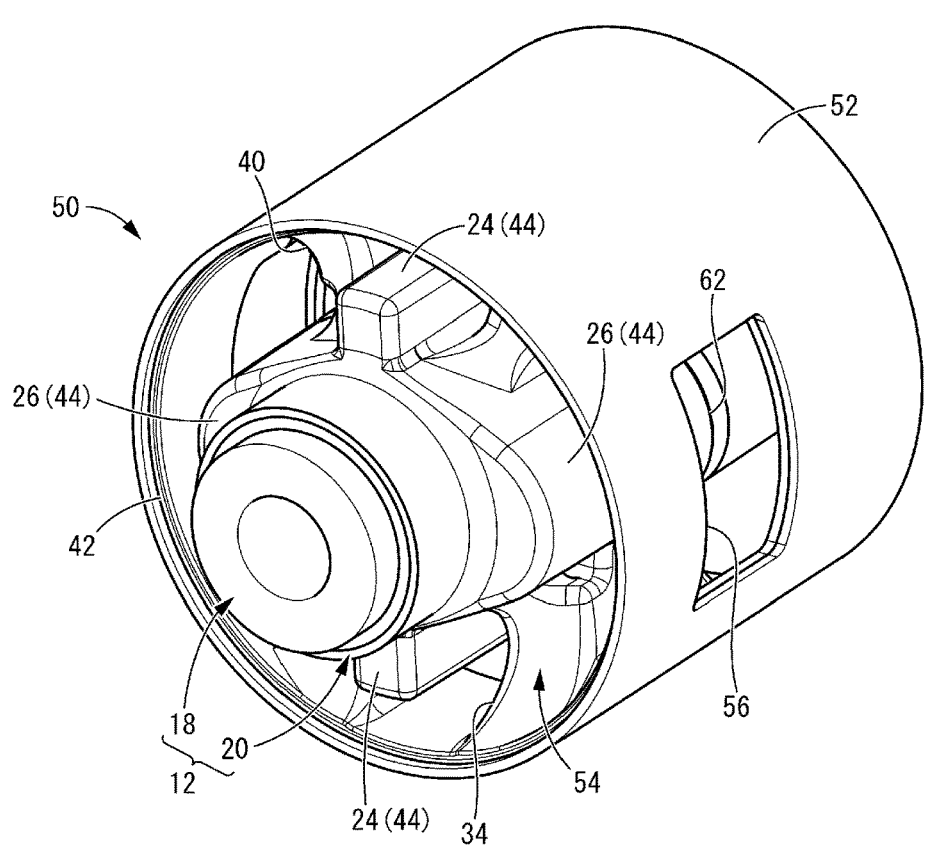
FIG. 8 is a perspective view showing an engine mount as the second embodiment of the disclosure.
Figure 9:
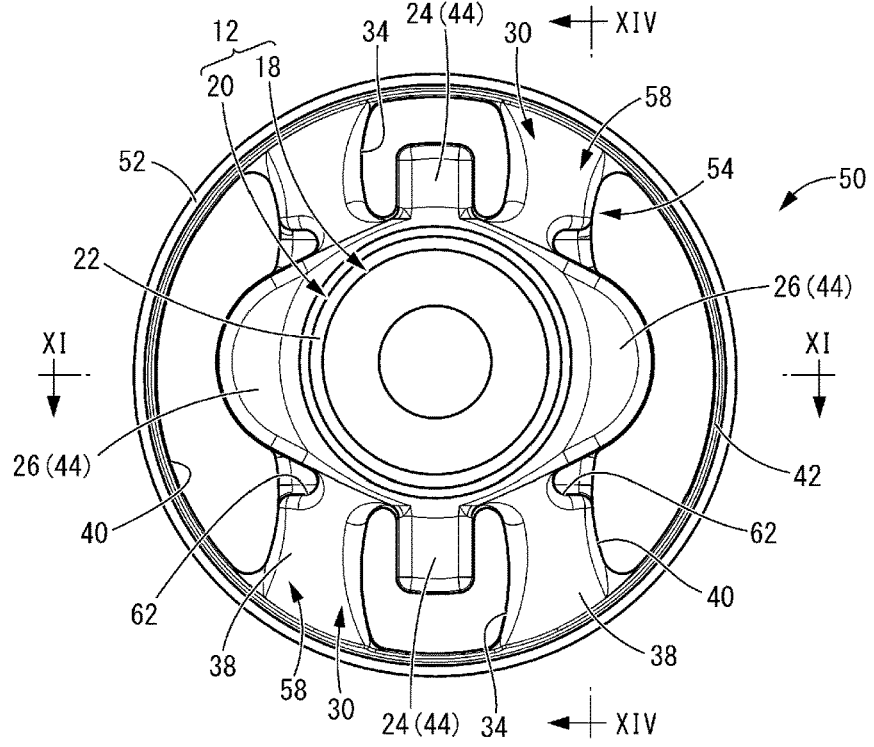
FIG. 9 is a front view of the engine mount shown in FIG. 8.

As shown in FIG. 6 and FIG. 7, the second elastic joining part 32 is fixed to the vertically opposing inner surfaces of the outer tubular member 14 through the groove-shaped recess 28. The second elastic joining part 32 extends in the vertical direction through the groove-shaped recess 28 so that the second elastic joining part 32 is provided at a position apart from the inner axial member 12 in a vertical projection. A pair of left and right second elastic joining parts 32 are provided at positions corresponding to the pair of left and right groove-shaped recesses 28. The groove-shaped recess 28 is filled with a part of the elastic rubber main body 16 including the second elastic joining part 32. The second elastic joining part 32 integrally includes a central portion 36 arranged within the groove-shaped recess 28 and outer portions 38 protruding outward in the vertical direction with respect to the groove-shaped recess 28.

In this embodiment, the lateral width w2 of the second elastic joining part 32 is larger than the lateral width w1 of the first elastic joining part 30. Thus, a low spring in the vertical direction and high springs in the axial direction and the lateral direction, which will be described later, are efficiently achieved. However, the dimension relationship and ratio of the lateral widths of the first elastic joining part 30 and the second elastic joining part 32 can be appropriately changed according to the required spring ratio or the like.

Figure 4:
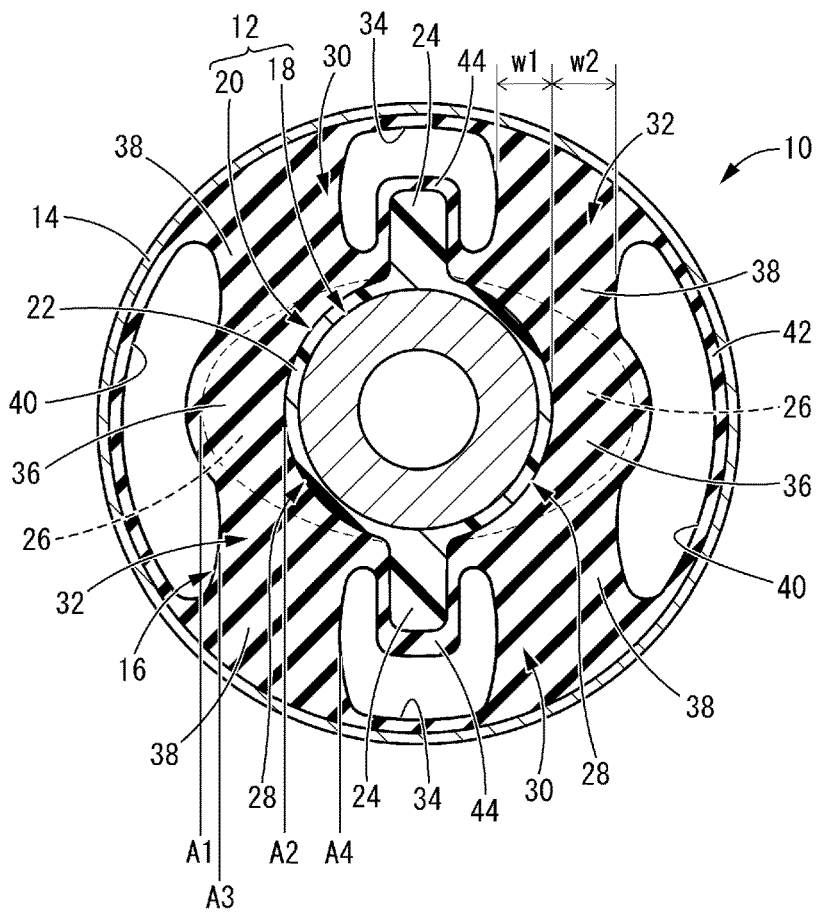
FIG. 4 is a cross-sectional view along the line IV-IV of FIG. 3.

In this embodiment, a position A3 of the lateral outer surface of the outer portion 38 of the second elastic joining part 32, in other words, a laterally innermost position A3 of the inner surface of a second hollow hole 40 is set between a position A1 of the protruding tip of the second stopper protrusion 26 and a position A2 of the bottom wall surface of the groove-shaped recess 28 in a direction perpendicular to the axis, which is the lateral direction of FIG. 4. In addition, similarly, a position A4 of the lateral inner surface of the outer portion 38 of the second elastic joining part 32, in other words, a laterally outermost position A4 of the inner surface of the first hollow hole 34 is set inside the outer peripheral surface of the inner axial member 12 in the lateral direction beyond the position A2 of the bottom wall surface of the groove-shaped recess 28. It should be noted that the position A4 can also be set outside the position A2 in the lateral direction, and in this case, the spring can be made even lower in the vertical direction. In this way, the position A4 can be arbitrarily set with respect to the position A2 according to the low spring properties in the vertical direction. When the position A4 is set outside the position A2 in the lateral direction, for example, the first elastic joining part 30 is provided axially outside the groove-shaped recess 28 so as to connect the outer tubular member 14 and the second stopper protrusion 26 in the vertical direction.

The outer portion in the vertical direction of the elastic rubber main body 16 which is arranged at a position apart from the inner axial member 12 in an axial projection has an axial end surface that is a curved surface recessed in a concave shape outward in the axial direction. Then, the outer portion of the elastic rubber main body 16 has the smallest axial length in the middle of the vertical direction, and the axial length of the outer end in the vertical direction on the side of the outer tubular member 14 is larger than the axial length of the inner end in the vertical direction on the side of the inner axial member 12. In the second elastic joining part 32 of the elastic rubber main body 16, the outer portion 38 protruding outward in the vertical direction with respect to the groove-shaped recess 28 has an axial length that gradually increases from the portion where the axial length is the smallest toward the outer side in the vertical direction on the side of the outer tubular member 14. The smallest length L of the second elastic joining part 32 in the axial direction is smaller than the smallest groove width W of the groove-shaped recess 28. It should be noted that the axial length of the entire outer portion 38 can also be smaller than the smallest groove width W of the groove-shaped recess 28. According to this configuration, the spring is reduced in the vertical direction. In this way, the axial length of the entire outer portion 38 can be arbitrarily set according to the low spring properties and durability in the vertical direction. In this case, the laterally outermost position A4 (see FIG. 4) of the inner surface of the first hollow hole 34 can also be set outside the position A2 (see FIG. 4) of the bottom wall surface of the groove-shaped recess 28 in the lateral direction.

Preferably, as in this embodiment, in the axial direction that is the lateral direction of FIG. 7, the axially innermost points (points shown as both ends of L in FIG. 7) on both axial end surfaces that are concave curved surfaces of the second elastic joining part 32 are both set and positioned axially inward of the axially outer end B1 of the inclined surface 27 of the second stopper protrusion 26 of the resin member 20, and more preferably, set and positioned axially inward of the axially inner end B2 of the inclined surface 27. The first elastic joining part 30 may be set so that the axially innermost points on both axial end surfaces thereof are positioned axially outward from B1 and B2 of the second stopper protrusion 26 of the resin member 20.

Each second elastic joining part 32 is formed with the second hollow hole 40 penetrating in the axial direction. The second hollow hole 40 is provided outside the inner axial member 12 in the lateral direction, and is provided outside the second elastic joining part 32 in the lateral direction. The second elastic joining part 32 is separated inward in the lateral direction from the outer tubular member 14 by the second hollow hole 40 in the middle in the vertical direction apart from the upper and lower ends fixed to the inner peripheral surface of the outer tubular member 14. The second hollow hole 40 has a vertical length larger than the diameter (vertical width) of the shaft fitting 18 of the inner axial member 12, and extends to the outer side in the vertical direction from both ends of the shaft fitting 18 in the vertical direction.

The pair of left and right second stopper protrusions 26 protrude into the pair of left and right second hollow holes 40, respectively. The protruding tip of the second stopper protrusion 26 is separated from the inner surface on the left and right outer sides of the second hollow hole 40 so as to form a predetermined stopper clearance.

The inner peripheral surface of the outer tubular member 14 is covered with a covering rubber layer 42 integrally formed with the elastic rubber main body 16. Further, the entire outer peripheral surface of the resin member 20 that constitutes the inner axial member 12 is covered with the elastic rubber main body 16 including the covering rubber layer 42, etc. For example, the surfaces of the first stopper protrusion 24 and the second stopper protrusion 26 are respectively covered with a buffer rubber 44 integrally formed with the elastic rubber main body 16.

Figure 1:
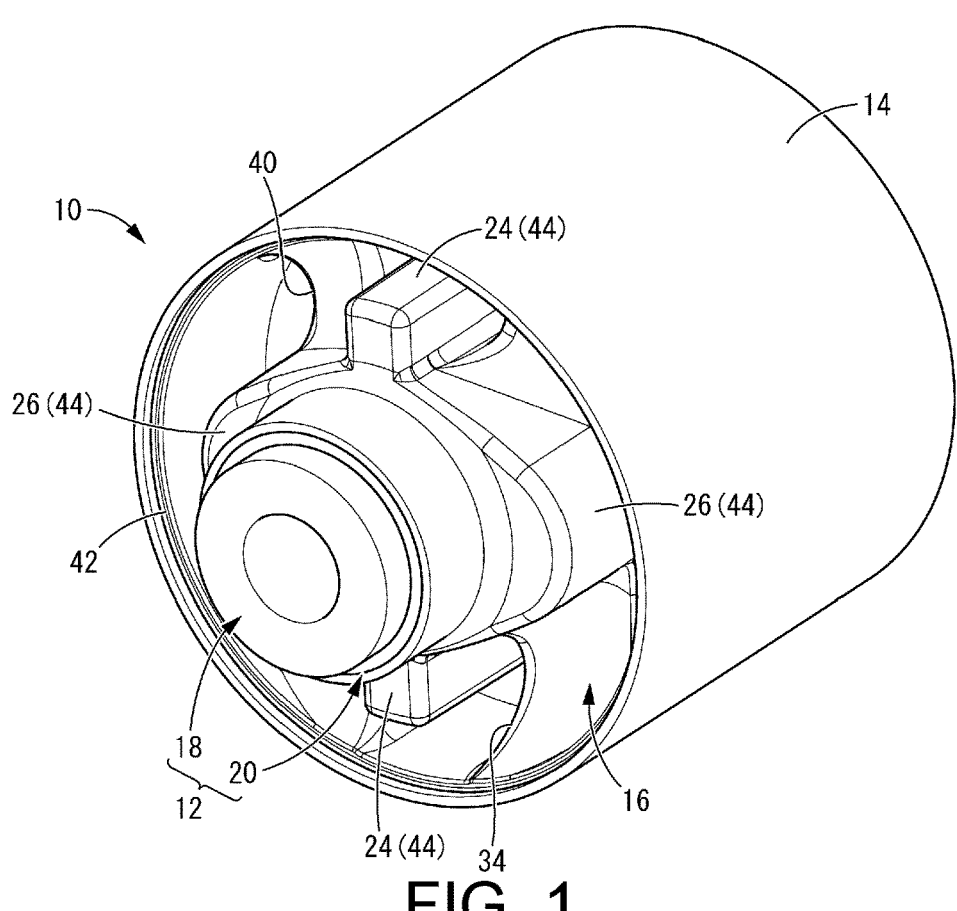
FIG. 1 is a perspective view showing an engine mount as the first embodiment of the disclosure.
Figure 2:
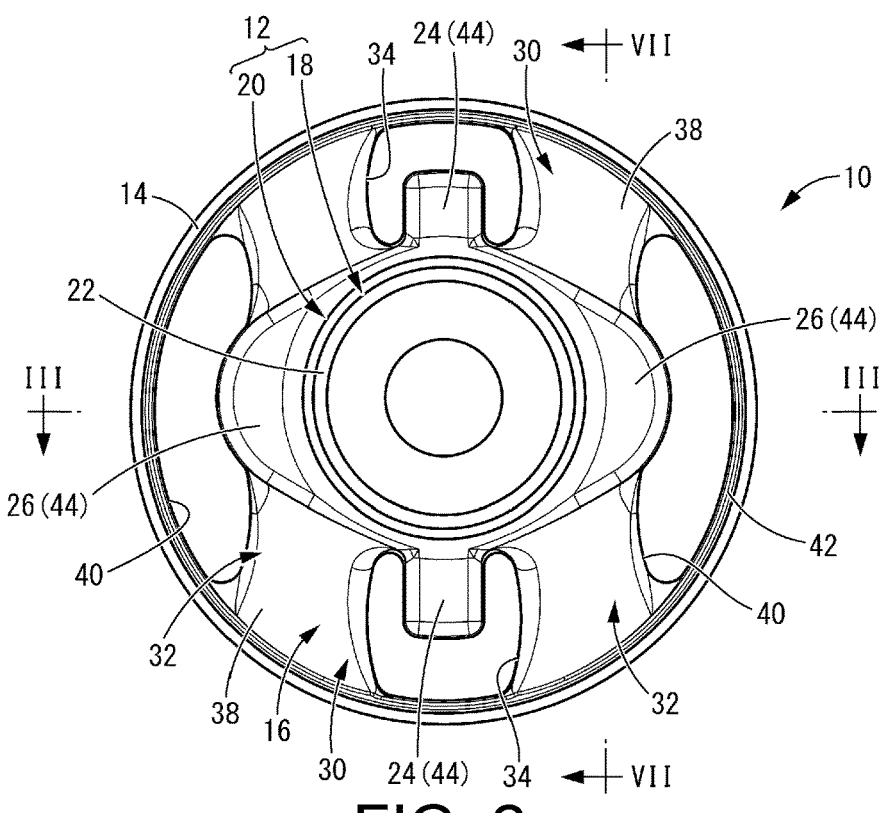
FIG. 2 is a front view of the engine mount shown in FIG. 1.
Figure 3:
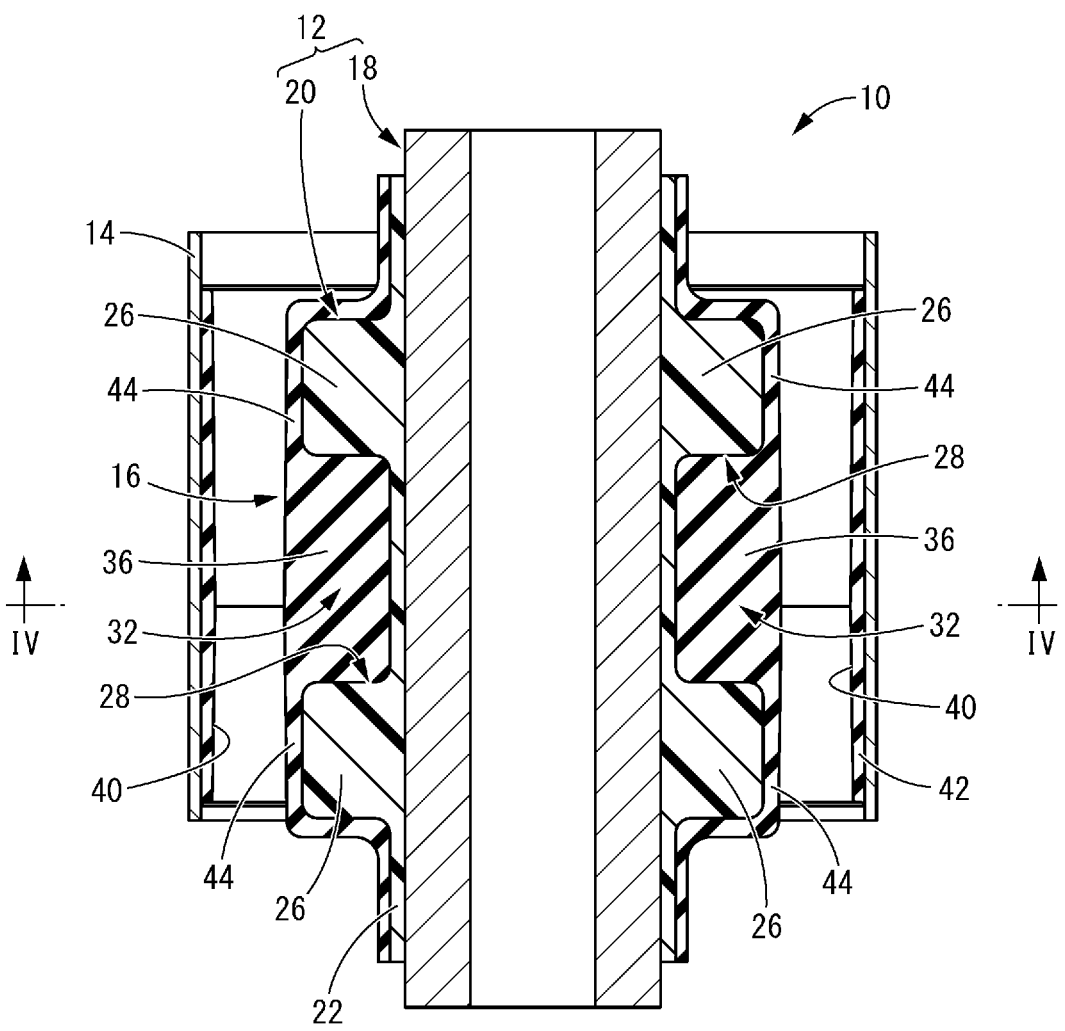
FIG. 3 is a cross-sectional view along the line III-III of FIG. 2.

As shown in FIG. 2, FIG. 6, and FIG. 7, since the elastic rubber main body 16 of this embodiment fills the entire interior of the groove-shaped recess 28, it is possible to mold with a simple structure mold (not shown) divided in the axial direction. The elastic rubber main body 16 of this embodiment is formed as an integrally vulcanized molded product including the inner axial member 12 and the outer tubular member 14, and for example, a process such as bonding the outer tubular member 14 after molding the elastic rubber main body 16 is not required.

The engine mount 10 having such a structure exhibits hard spring properties due to compressive deformation of the elastic rubber main body 16 when vibration is input in the vertical direction. Here, when vibration is input to the elastic rubber main body 16 in the vertical direction, substantially the entire first elastic joining part 30 is compressed between the inner axial member 12 and the outer tubular member 14 while the second elastic joining part 32 arranged apart from the inner axial member 12 in the vertical projection is hardly compressed. In this way, the elastic rubber main body 16 has a limited portion compressed between the inner axial member 12 and the outer tubular member 14, and the spring properties in the vertical direction can be made relatively soft.

Furthermore, when vibration is input in the axial direction, soft spring properties are exhibited mainly due to shear deformation of the elastic rubber main body 16. The elastic rubber main body 16 is provided with the second elastic joining parts 32 on both left and right outer sides of the first elastic joining part 30, and since the elastic rubber main body 16 has a large cross-sectional area in the portion that undergoes shear deformation due to the input of vibration in the axial direction, the spring properties in the axial direction can be made relatively hard.

Further, when vibration is input in the lateral direction, soft spring properties are exhibited mainly due to shear deformation of the elastic rubber main body 16. The elastic rubber main body 16 is provided with the second elastic joining parts 32 on the left and right outer sides of the first elastic joining part 30, and since the elastic rubber main body 16 has a large cross-sectional area in the portion that undergoes shear deformation due to the input of vibration in the lateral direction, the spring properties in the lateral direction can be made relatively hard.

In this way, the engine mount 10 can set a relatively small spring constant in the vertical direction where the compression spring component tends to increase the spring constant, and can set a relatively large spring constant in the axial direction and the lateral direction where the shear spring component tends to reduce the spring constant than in the vertical direction. Thus, the degree of freedom in tuning the spring in each direction is increased, and it becomes possible to set the spring in each direction more appropriately when it is required to set the spring ratio small in the vertical direction, the axial direction, and the lateral direction, for example.

In addition, while the lateral width of the first elastic joining part 30 is reduced to set a small spring constant in the vertical direction, the second elastic joining parts 32 are integrally and continuously provided on both outer sides of the first elastic joining part 30 in the lateral direction so as to ensure the cross-sectional area of the elastic rubber main body 16. Thus, buckling of the elastic rubber main body 16 during input is prevented, and it is possible to achieve the load resistance and durability required for the engine mount 10 while achieving the desired spring properties.

The groove width of the groove inner surface of the groove-shaped recess 28 to which the second elastic joining part 32 is fixed is widened toward both sides in the vertical direction. Thus, when vibration is input in the vertical direction, the restriction on the deformation of the second elastic joining part 32 due to the second stopper protrusion 26, which is the side wall of the groove-shaped recess 28, is reduced, making it easy to achieve soft spring properties.

The spring constant in the vertical direction is reduced by forming the first hollow hole 34 penetrating the first elastic joining part 30 in the axial direction. Since the first hollow hole 34 is provided in the laterally central portion where the compression spring component is particularly dominant in the first elastic joining part 30, the spring constant in the vertical direction can be efficiently reduced. In addition, since the elastic rubber main body 16 has a symmetrical structure by forming the first hollow hole 34 in the laterally central portion, it becomes easy to prevent strain concentration and achieve load support performance and spring properties, for example.

By forming the second hollow hole 40 that penetrates the second elastic joining part 32, soft spring properties are achieved, which achieves, for example, a good ride comfort in the automobile. Further, by forming the second hollow holes 40 respectively on both sides in the lateral direction, the elastic rubber main body 16 has a substantially laterally symmetrical structure, which makes it easy to prevent strain concentration and achieve load support performance and spring properties, for example.

Further, both end surfaces of the elastic rubber main body 16 in the lateral direction are not divided into upper and lower sides by the inner axial member 12 and extend continuously in the vertical direction through the groove-shaped recesses 28. Thus, the vertical free length tends to be shortened by the inclination of the outer tubular member 14 due to the tubular shape, and the free length of the elastic rubber main body 16 at both end portions of the elastic rubber main body 16 in the lateral direction can be ensured long, which improves the durability of the elastic rubber main body 16.

When a large load is input in the vertical direction and causes the inner axial member 12 to be largely displaced relative to the outer tubular member 14 in the vertical direction, the first stopper protrusions 24 of the inner axial member 12 come into contact with the outer tubular member 14, thereby limiting the amount of relative displacement between the inner axial member 12 and the outer tubular member 14. Such a stopper structure in the vertical direction avoids damage caused by excessive deformation of the elastic rubber main body 16 and improves the durability. Since the surface of the first stopper protrusion 24 and the inner peripheral surface of the outer tubular member 14 are covered with rubber elastic bodies (covering rubber layer 42, buffer rubber 44), the impact sound generated when the first stopper protrusion 24 and the outer tubular member 14 come into contact with each other is reduced.

When a large load is input in the lateral direction and causes the inner axial member 12 to be largely displaced relative to the outer tubular member 14 in the lateral direction, the second stopper protrusions 26 of the inner axial member 12 come into contact with the outer tubular member 14, thereby limiting the amount of relative displacement between the inner axial member 12 and the outer tubular member 14. Further, since the second stopper protrusions 26 are provided on both sides of the inner axial member 12 in the axial direction, the amount of relative displacement between the inner axial member 12 and the outer tubular member 14 in the torsional direction (tilting direction) is also limited by the contact between the second stopper protrusions 26 and the outer tubular member 14. Such a stopper structure in the lateral direction and the torsional direction avoids damage caused by excessive deformation of the elastic rubber main body 16 and improves the durability. Since the surface of the second stopper protrusion 26 and the inner peripheral surface of the outer tubular member 14 are covered with the rubber elastic bodies 42 and 44, the impact sound generated when the second stopper protrusion 26 and the outer tubular member 14 come into contact with each other is reduced.

FIG. 8 to FIG. 14 show an engine mount 50 as the second embodiment of the disclosure. The engine mount 50 has a structure in which an inner axial member 12 and an outer tubular member 52 are elastically joined by an elastic rubber main body 54. In the description of this embodiment, members and parts that are substantially the same as the first embodiment are denoted by the same reference numerals in the drawings, and the description thereof is omitted.

The outer tubular member 52 is a substantially tubular hard member similar to the outer tubular member 14 of the first embodiment, and as shown in FIG. 8 and FIG. 10 to FIG. 12, windows 56 are respectively formed on both sides of the outer tubular member 52 in the lateral direction. The window 56 is a hole having a substantially square cross section that penetrates the outer tubular member 52 in the lateral direction, and is formed at a position substantially corresponding to a groove-shaped recess 28 of the inner axial member 12.

The outer tubular member 52 is arranged in a state of sheathing the inner axial member 12, and the inner axial member 12 and the outer tubular member 52 are elastically joined by the elastic rubber main body 54. The elastic rubber main body 54 integrally includes a first elastic joining part 30 fixed to the vertically opposing surfaces of the inner axial member 12 and the outer tubular member 52, and a second elastic joining part 58 fixed to the vertically opposing inner surfaces of the outer tubular member 52 through the groove-shaped recess 28 of the inner axial member 12.

Figures 10, 11:
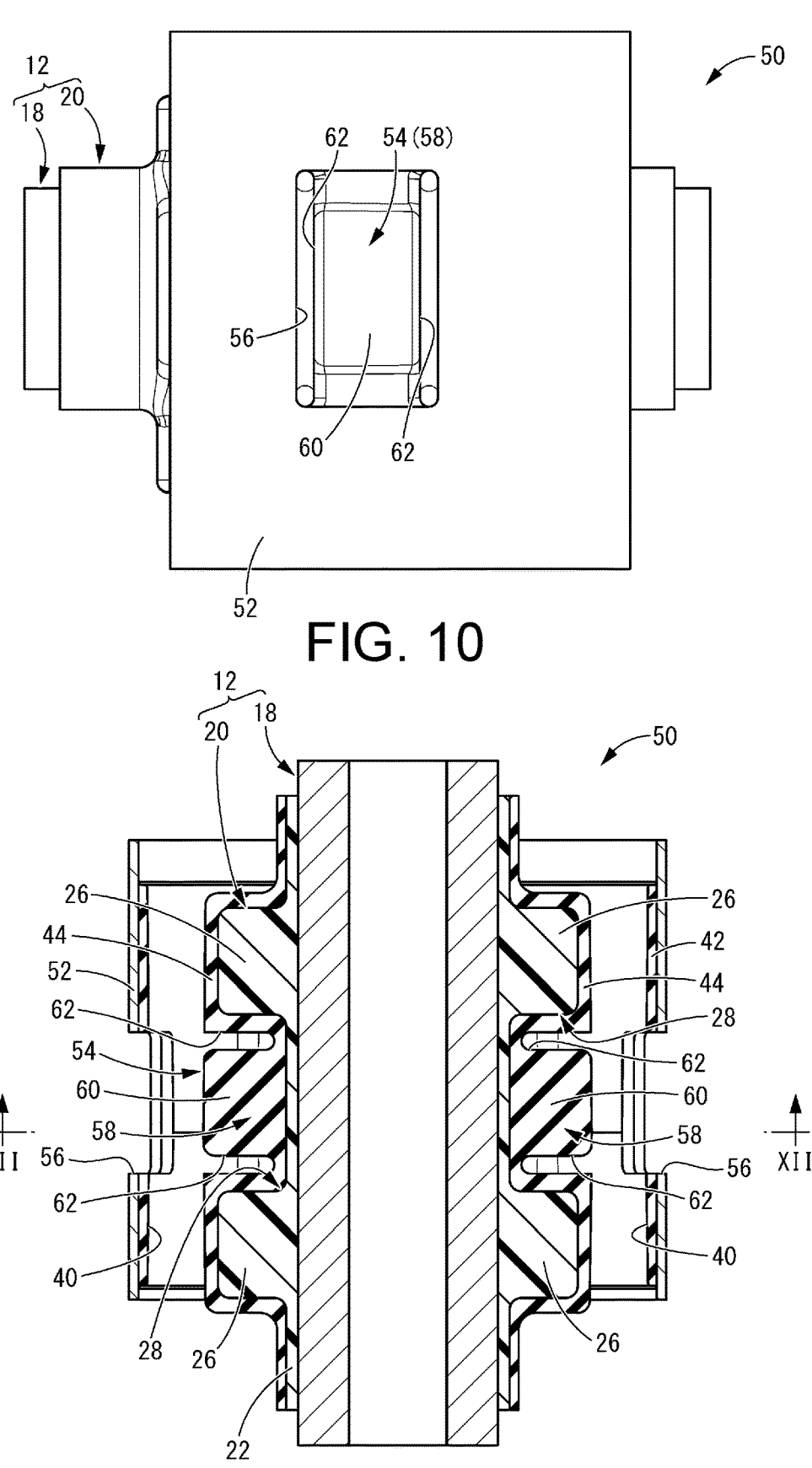
FIG. 10 is a right side view of the engine mount shown in FIG. 9.
FIG. 11 is a cross-sectional view along the line XI-XI of FIG. 9.
Figure 12:
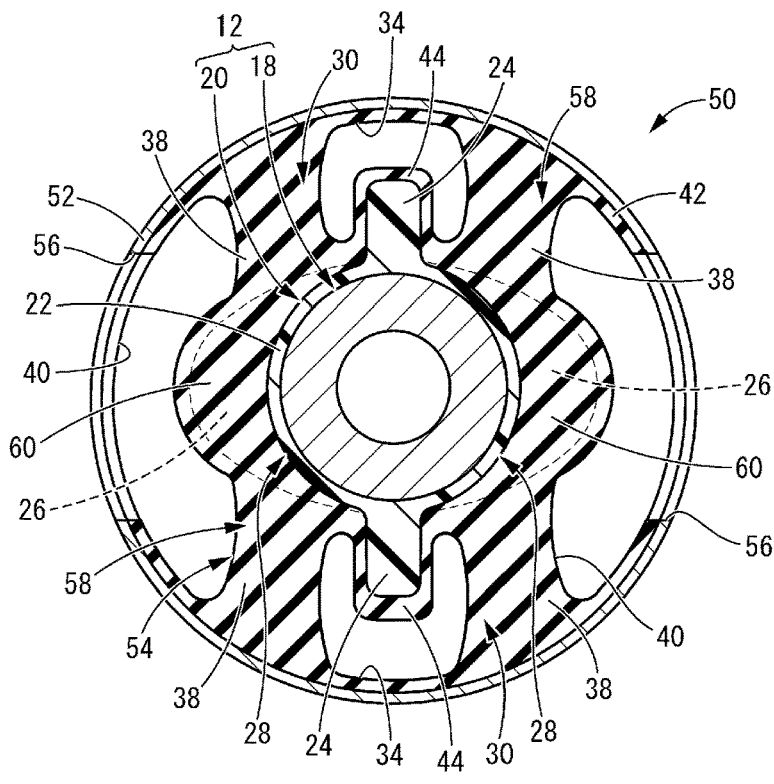
FIG. 12 is a cross-sectional view along the line XII-XII of FIG. 11.
Figure 13:
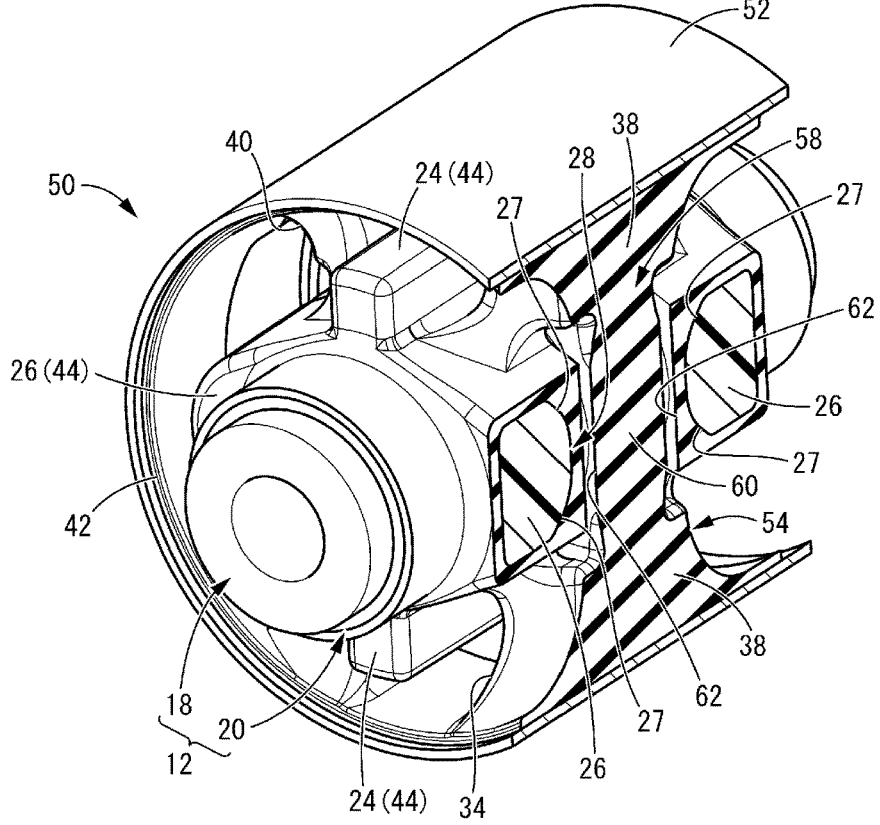
FIG. 13 is a perspective cross-sectional view of the engine mount shown in FIG. 8.
Figure 14:
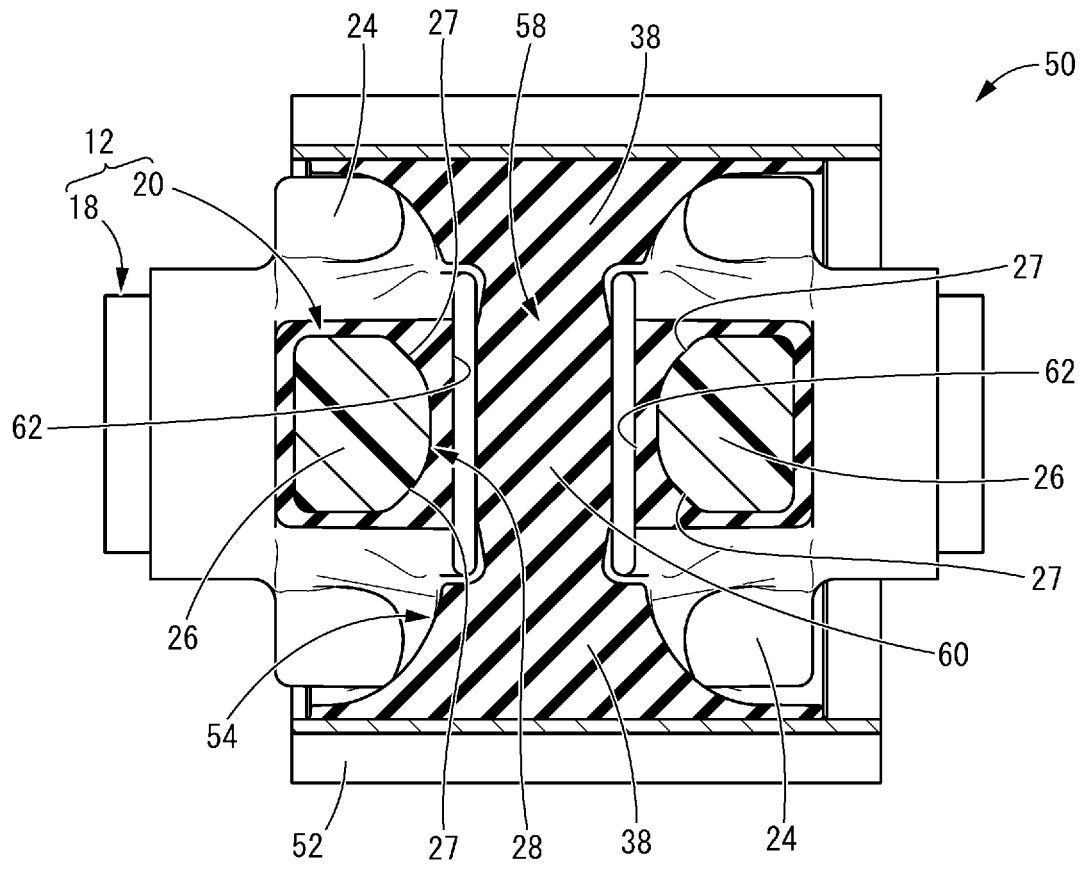
FIG. 14 is a cross-sectional view along the line XIV-XIV of FIG. 9.

As shown in FIG. 11 and FIG. 14, a central portion 60, which extends within the groove-shaped recess 28, of the second elastic joining part 58 is spaced inward in the axial direction (groove width direction of the groove-shaped recess 28) from the second stopper protrusions 26 that constitute both side walls of the groove-shaped recess 28. In other words, a vertically extending slit-shaped groove 62 is provided between the rubber elastic body fixed to the surface of each second stopper protrusion 26 and the central portion 60 of the second elastic joining part 58. The grooves 62 open on the outer surface in the lateral direction on both sides of the second elastic joining part 58 in the axial direction and extend linearly in the vertical direction. By providing the second elastic joining part 58 with the grooves 62, the axial width of the central portion 60 is reduced. The groove 62 of this embodiment extends to the outer side in the vertical direction with respect to the second stopper protrusion 26, and is exposed at a position apart from the second stopper protrusion 26 outward in the vertical direction in the axial projection shown in FIG. 9.

The groove 62 is formed by a mold (not shown) divided in the lateral direction, for example. That is, the groove 62 can be molded by a mold that is inserted in the lateral direction into the inner circumference of the outer tubular member 52 through the window 56 so as to separate the central portion 60 of the second elastic joining part 58 and the second stopper protrusion 26 (the side wall inner surface of the groove-shaped recess 28). By providing the window 56 in the outer tubular member 52 in this way, even if the entire interior of the groove-shaped recess 28 is not filled with the elastic rubber main body 54 in the structure, the elastic rubber main body 54 can still be formed as an integrally vulcanized molded product including the inner axial member 12 and the outer tubular member 52. The entire groove 62 is arranged at a position corresponding to the window 56 in the lateral projection shown in FIG. 10, and is exposed to the outside through the window 56.

According to the engine mount 50 of this embodiment, the central portion 60 of the second elastic joining part 58 is spaced from the side wall inner surface of the groove-shaped recess 28 by the groove 62. Thus, the restriction on the second elastic joining part 58 due to the side wall (second stopper protrusion 26) of the groove-shaped recess 28 can be reduced to achieve lower spring properties in the vertical direction.

Since the groove 62 extends further to both outer sides in the vertical direction with respect to the side wall of the groove-shaped recess 2 in this embodiment, the restriction on the central portion 60 of the second elastic joining part 58 due to the side wall of the groove-shaped recess 28 is further reduced, which advantageously reduces the spring in the vertical direction.

Although the embodiments of the disclosure have been described in detail above, the disclosure is not limited by the specific description. For example, the shaft fitting 18 that constitutes the inner axial member 12 is not necessarily limited to a tubular shape, and may have an elliptical tubular shape, a polygonal tubular shape, an irregular tubular shape, or the like. Moreover, the inner axial member 12 is not necessarily limited to a composite structure of a metal material and a resin material, and the entire inner axial member 12 can also be made of resin or metal.

Although it is desirable that the groove-shaped recess 28 of the inner axial member 12 is widened toward both outer sides in the vertical direction, the groove-shaped recess 28 may extend with a constant groove width, for example. In addition, the groove width of the groove-shaped recess 28 in the central portion in the vertical direction is not necessarily constant, and the groove width may vary over the entire groove-shaped recess 28 in the vertical direction.

The first hollow hole 34 is not essential. Further, the spring properties can also be adjusted by providing a first hollow recess having a bottomed concave shape which opens on the end surface in the axial direction and does not penetrate in the axial direction in place of the first hollow hole 34, for example. Similarly, the second hollow hole 40 is not essential. Further, a second hollow recess having a bottomed concave shape can also be used in place of the second hollow hole 40, for example.

The first stopper protrusion 24 protruding into the first hollow hole 34 is not essential. Further, the first stopper protrusion may be provided to protrude from the side of the outer tubular member 14 toward the inner axial member 12.

In the above-described embodiments, the second stopper protrusion 26 protruding into the second hollow hole 40 constitutes the side wall of the groove-shaped recess 28, but the second stopper protrusion may be provided separately from the side wall of the groove-shaped recess 28. When the second stopper protrusion is provided separately from the side wall of the groove-shaped recess 28, the second stopper protrusion may be provided to protrude from the side of the outer tubular member 14 toward the side of the inner axial member 12. When the side wall of the groove-shaped recess 28 does not constitute the second stopper protrusion, the second stopper protrusion is not essential.

In the first embodiment, the entire interior of the groove-shaped recess 28 is filled with the elastic rubber main body 16, but a part of the elastic rubber main body 16 having a lateral height that does not reach the entire depth direction (lateral direction) of the groove-shaped recess 28, for example, may fill only the bottom side of the groove-shaped recess 28 that does not reach the openings on the laterally outer sides.

What is claimed is:

1. A tubular antivibration device in which an inner axial member and an outer tubular member are joined by an elastic rubber main body,
   wherein the inner axial member comprises a pair of groove-shaped recesses that open on an outer peripheral surface on both sides in a lateral direction and extend in a vertical direction,
   the elastic rubber main body integrally comprises a pair of upper and lower first elastic joining parts joining vertically opposing surfaces of the inner axial member and the outer tubular member to each other on both sides in the vertical direction, and a pair of left and right second elastic joining parts joining vertically opposing surfaces of the outer tubular member to each other through the pair of groove-shaped recesses of the inner axial member,
   each of the second elastic joining parts has an axial length that is increased toward both outer sides in the vertical direction, and
   each of the second elastic joining parts has a smallest axial length that is equal to or smaller than a groove width of one of the groove-shaped recesses.

2. The tubular antivibration device according to claim 1, further comprising a first hollow hole formed to penetrate one of the first elastic joining parts of the elastic rubber main body in an axial direction, and a first stopper protrusion provided on one of the vertically opposing surfaces of the inner axial member and the outer tubular member to protrude into the first hollow hole.

3. The tubular antivibration device according to claim 1, further comprising second hollow holes formed to penetrate in the axial direction on outer sides in the lateral direction with respect to the second elastic joining parts of the elastic rubber main body.

4. The tubular antivibration device according to claim 3, further comprising second stopper protrusions respectively provided on both sides of the inner axial member in the axial direction to protrude into the second hollow holes in the lateral direction,
   wherein the groove-shaped recesses are provided axially between the second stopper protrusions on both sides in the axial direction.

5. The tubular antivibration device according to claim 1, wherein each of the groove-shaped recesses has an axial groove width that increases toward both outer sides in the vertical direction at both end portions thereof in the vertical direction, and the elastic rubber main body comprising the second elastic joining parts is filled inside the groove-shaped recesses.

6. The tubular antivibration device according to claim 1, wherein the second elastic joining parts are arranged apart from a side wall inner surface of the groove- shaped recesses on an inner side thereof in a groove width direction.

* * * * *